Dec. 15, 1959   J. R. COBB, JR   2,916,888
HYDROCARBON PURIFICATION PROCESS
Filed Dec. 29, 1955
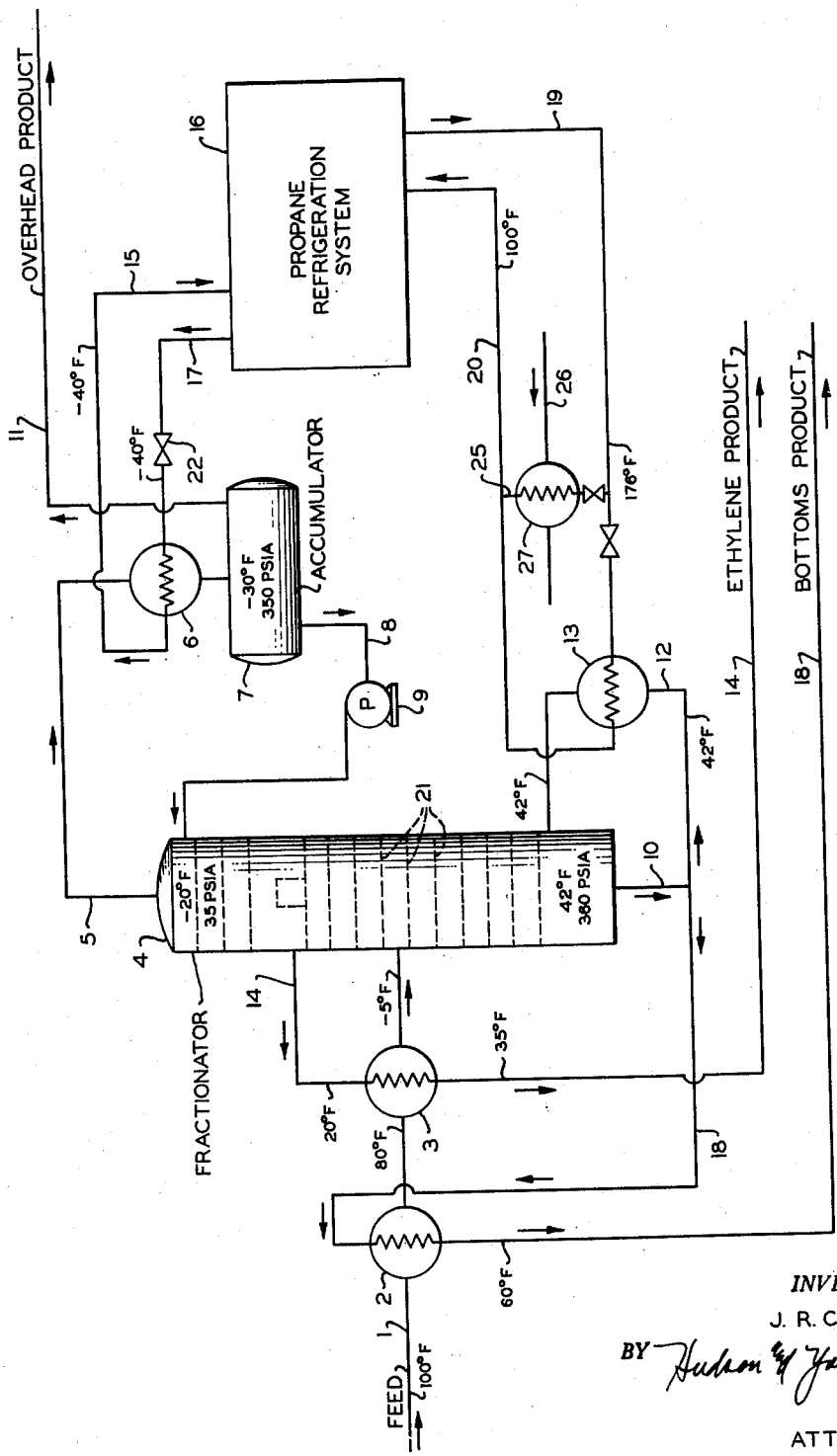
INVENTOR.
J. R. COBB, JR.
BY Hudson & Young
ATTORNEYS

United States Patent Office 2,916,888
Patented Dec. 15, 1959

2,916,888

HYDROCARBON PURIFICATION PROCESS

Joseph R. Cobb, Jr., Bartlesville, Okla., assignor to Phillips Petroleum Company, a corporation of Delaware Application December 29, 1955, Serial No. 556,248

5 Claims. (Cl. 62—33)

This invention relates to purification of hydrocarbon components from a mixture by fractional distillation. In one aspect, it relates to the separation of one component from a mixture containing at least one component lower boiling and at least one component higher boiling than the component being separated. In another aspect, it relates to separation of ethylene from mixtures containing at least ethylene, methane and ethane.

One object of this invention is to provide a method for the separation by fractional distillation of one component boiling intermediate the boiling points of two other components from a mixture of the three.

Another object of this invention is to provide a method for the separation of at least one hydrocarbon from a mixture of hydrocarbons containing at least one hydrocarbon lower and at least one hydrocarbon higher boiling than the hydrocarbon being separated with as little equipment as possible in order to reduce capital investment.

Still another object of this invention is to provide a method for separating ethylene from mixtures containing ethylene, methane and ethane which requires a minimum of refrigeration load.

Other objects and advantages of my invention will be realized upon reading the following description which taken with the attached drawing forms a part of this specification.

I have devised a method for separating a first component from a feed mixture separable by fractional distillation and containing said first component and at least one other component boiling below said first component and at least another component boiling above said first component comprising fractionally distilling said mixture to produce a kettle product comprising said component boiling above said first component and an overhead product comprising said component boiling below said first component, withdrawing a side stream from the fractional distillation operation, passing the withdrawn side stream in indirect heat exchange with said feed mixture and withdrawing the heat exchanged side stream as the main product of the process.

This method is particularly adapted for the separation of ethylene from mixtures containing methane, ethane and ethylene. By normal atmospheric temperatures as used throughout this specification and claims, I mean ambient temperatures such as those which exist in winter seasons as well as summer. Such temperatures easily include those from 40° F. or lower to as high as 100° F. even higher.

A fractionating column, to be described hereinafter, is provided with vapor-liquid contacting apparatus which is more or less conventional in the art. I prefer to employ such contacting apparatus as bubble cap trays, because such apparatus is adapted to impart efficient vapor-liquid contacting.

In the drawing, the figure represents in diagrammatic form one arrangement of apparatus parts adapted to carry out the process of my invention.

In the drawing, reference numeral 1 identifies a pipe in which feed stock from a source, not shown, is conducted to my treating system. From pipe 1 feed stock passes through a heat exchanger 2, a second heat exchanger 3 and then is introduced into a fractionating column 4. The bubble cap tray to which the feed stock is introduced contains material of about the same composition as the feed stock. Overhead vaporous material is removed from fractionator 4 through a overhead pipe 5. This material is passed through a condenser 6 serving as a reflux condenser, condensate and uncondensed gases being separated in an accumulator 7. Condensate for refluxing the column is passed through a pipe 8 by pump 9 and is introduced into the upper portion of the column. Gases not condensed in the reflux condenser and separated in accumulator 7 are removed through a pipe 11 as the overhead product of the process. Bottoms material from the kettle section of column 4 is removed through a pipe 10 and is divided into two portions. One portion is passed through a pipe 12 through a reboiler heat exchanger 13 and is returned to the kettle section of the column. The other portion is passed through a pipe 18 and through heat exchanger 2 and then is removed as a bottoms product of the process.

A side stream is removed from the fractionator 4 at a level intermediate the top of the column and the level of feed entry through a pipe 14 and this material is passed through the heat exchanger 3 and then is removed as the main product of the process. A refrigeration system 16 is provided with compressors and heat exchangers all of which are conventional in the art and are not shown herein nor described in detail for purposes of brevity. Compressed refrigerant flows from system 16 through a pipe 19 and at least a portion thereof flows through heat exchanger 13 to provide reboiling heat for the kettle of the column. The remainder of the refrigerant passes through pipe 25 and exchanger 27. Exchanger 27 is cooled with plant cooling water. The amount of the refrigerant passing through exchanger 13 is that required to reboil column 4 while the remainder of the refrigerant from pipe 19 flows through pipe 25 and is condensed in condenser 27 by plant cooling water from pipe 26. The heat exchanger and condensed refrigerant is returned to system 16 through a return pipe 20. The condensed refrigerant is passed from system 16 through a pipe 17 and is allowed to vaporize on passage through a pressure reducing valve 22 for providing refrigeration for condenser 6. Vaporized refrigerant from condenser 6 is passed by way of line 15 to the refrigeration system 16.

The bubble cap-tray packing or vapor-liquid contacting apparatus of column 4 is identified by reference numeral 21.

As an example of the utility of my separation system, a charge stock containing methane, ethylene and ethane from the feed pipe 1 at about 100° F. is cooled in exchanger 2 to about 80° F. This cooled material is chilled in exchanger 3 to a temperature of about −5° F. and is then introduced as charge stock into fractionator 21. The heat exchange medium in exchanger 3 is a side stream material withdrawn from the column at about a level indicated in the figure through pipe 14. In such a system operating at a column pressure between about 355 and 360 p.s.i.a. at a kettle temperature of 42° F. and a top tray temperature of about −20° F. this withdrawn side stream has a temperature of about −20° F.. Thus appreciable chilling is imparted to the feed stock in exchanger 3.

To provide reflux to the column and reboiling heat, I will explain the operation of a refrigeration system in which propane is the refrigerant. Such a refrigeration system is more or less conventional in the art and detailed explanation thereof is believed unnecessary. Compressed vaporous refrigerant is passed through line 19 at a temperature of about 176° F. and the propane at this temperature provides sufficient heat in exchanger 13 for reboiling the column 4 with the propane emerging from the exchanger at a temperature of about 100° F. as a liquid. The refrigerant propane emerging from exchanger 27 also has a temperature of about 100° F. The refrigerant propane on passing through exchangers 13 and 27 is substantially completely condensed therein so that only liquid propane returns via pipe 20 to system 16. The liquefied propane is passed from system 16 through line 17 and is allowed to partially vaporize through expansion valve 22 and the refrigeration available from this partial evaporation provides sufficient chilling in condenser 6 for production of reflux liquid for operation of the fractionator. The condensed reflux liquid has a temperature of about −30° F. and this chilled liquid is the liquid reflux passed through pipe 8 to the upper portion of the column. The top tower temperature is approximately −20° F. The vaporized refrigerant from condenser 6 has a temperature of about −40° F. and it is returned to the refrigeration system by way of pipe 15.

By providing such a refrigeration system with the kettle material from a distillation column providing at least a portion of the condensing load for the refrigeration system, this system is then able to provide sufficient reflux for operation of the column with a minimum of additional heat transfer material (plant cooling water) for condensation of the refrigerant prior to the vaporization step in valve 22. In the following tabulation is given a material balance in terms of pounds per operating day of 24 hours of the feed to the column (feed line 1), overhead gas product (line 11), bottoms product (line 18), and side stream (line 14).

| Stream No. | Column Feed 1 | Accumulator Vent 11 | Bottoms 18 | Side Stream 14 |
|---|---|---|---|---|
| Methane | 246 | 129 | | 117 |
| Ethylene | 33,832 | 714 | 262 | 32,856 |
| Ethane | 3,633 | | 1,926 | 1,707 |
| Cyclohexane | 2,404 | | 2,404 | |
| | 40,115 | 843 | 4,592 | 34,680 |

It will be noted from these compositions that over half of the methane content is removed from the system as gas through the accumulator vent while over half the ethane content is contained in the kettle product. Such a feed stock as illustrated herein is characteristic of a product from chemical manufacture in which ethylene is the product undergoing processing. It will be noted that less than 1000 pounds of ethylene is lost in the overhead and bottoms products while less than half of the ethane and methane contents are removed with the ethylene side stream product.

While I have explained the operation involving propane as a refrigerant it will be obvious to those skilled in the art that such a refrigerant as sulfur dioxide, methyl chloride, dichloro-difluoromethane or ammonia, or other suitable refrigerant can under some conditions be employed in place of the propane system illustrated herein. When using other refrigerants it will be noted that temperatures and pressures at various points in the refrigeration systems will be different from those encountered when employing propane but such changes are well understood by those skilled in the art.

When such a material is used as a charge stock as illustrated above all or substantially all of the cyclohexane is easily concentrated in the kettle product because of its relatively high boiling point. Because the fractionating column is operated at a fairly low temperature a considerable proportion of the ethane is removed from the system in the kettle product and if it is desired to separate the ethane from the cyclohexane the separation can be easily accomplished in a flashing operation because of the relatively low boiling point of the ethane as compared to that of cyclohexane.

One of the advantages of my method of operation of such a fractional distillation system is that only one fractionating column is required for the separation of both lighter and heavier components from a component boiling between the two. A second advantage is that by using heat exchange steps as herein disclosed the refrigeration load is greatly reduced. Thus by employing the kettle product and the side stream product as herein described based on the material balance given hereinabove, approximately 249,000 B.t.u. per hour are removed from the feed stream by exchangers 2 and 3. Furthermore, considerable energy is saved in the refrigeration system 16 because an appreciable proportion of the cooling for condensation of the compressed refrigerant is supplied by heat exchanger with the reboiler section of column 4.

Although I have described my process for the separation of ethylene from a mixture of methane, ethylene, ethane and containing some cyclohexane it is obvious that the process is adaptable for the separation of other mixtures of distillable materials such as for example isobutane can be separated from mixtures of propane, butane and isobutane.

While certain embodiments of my invention have been described for illustrative purposes the invention obviously is not limited thereto.

I claim:

1. A method for separating a first component from a feed mixture separable by fractional distillation and containing said first component and at least one other component boiling below said first component and at least another component boiling above said first component comprising fractionally distilling said mixture to produce a kettle product comprising said component boiling above said first component and an overhead product comprising said component boiling below said first component, vaporizing a liquefied refrigerant to chill same, passing the vaporized refrigerant in indirect heat exchange with overhead vapor material of the distillation operation to produce condensate, separating condensate from uncondensed gas, refluxing the distillation operation with said condensate and withdrawing the uncondensed gas as said overhead product, compressing the vaporized refrigerant, passing the compressed vaporized refrigerant in indirect heat exchange with kettle material of said distillation operation to provide reboiling heat to the operation whereby said compressed refrigerant is condensed, passing the condensed refrigerant to the refrigerant vaporizing step as said liquefied refrigerant, withdrawing kettle product, cooling the feed mixture to the operation in a first indirect heat exchange step with at least a portion of the withdrawn kettle product, withdrawing kettle product from said first heat exchange step as a second product of the operation, withdrawing a sidestream from the fractional distillation operation at a level above the feed mixture inlet, further cooling the feed mixture to the operation in a second indirect heat exchange step with the withdrawn sidestream, said second indirect heat exchange step being downstream of said first heat exchange step as regards direction of flow of the feed mixture, and withdrawing the sidestream product from the second heat exchange step as the main product of the process.

2. A method for separating a first component from a feed mixture separable by fractional distillation and containing said first component and at least one other component boiling below said first component and at least another component boiling above said first component comprising fractionally distilling said mixture to produce a kettle product comprising said component boiling above said first component and an overhead product comprising said component boiling below said first component, withdrawing a sidestream from the fractional distillation operation, passing the withdrawn sidestream in a first indirect heat exchange with said feed mixture to cool same, withdrawing the heat exchanged sidestream as a main product of the process, withdrawing kettle product from the distillation operation, passing at least a portion of the withdrawn kettle product in a second indirect heat exchange with the feed mixture upstream of said first indirect heat exchange as regards direction of flow of said feed mixture to cool same, and withdrawing the kettle product from said second indirect heat exchange as another product of the process.

3. A method for separating a first hydrocarbon from a feed mixture with at least one hydrocarbon boiling below said first hydrocarbon and at least one hydrocarbon boiling above said first hydrocarbon comprising fractionally distilling said mixture to produce a kettle product comprising said hydrocarbon boiling above said one hydrocarbon and an overhead product comprising said hydrocarbon boiling below said first hydrocarbon, withdrawing a sidestream from the fractional distillation operation, passing the withdrawn sidestream in a first indirect heat exchange with said feed mixture to cool same, withdrawing the heat exchanged sidestream as a main product of the process, withdrawing kettle product from the distillation operation, passing at least a portion of the withdrawn kettle product in a second indirect heat exchange with the feed mixture upstream of said first indirect heat exchange as regards direction of flow of said feed mixture to cool same, and withdrawing the kettle product from said second indirect heat exchange as another product of the process.

4. The method of claim 1 wherein the first component is ethylene, the component boiling below said first component is methane and the component boiling above said first component is ethane, and said sidestream comprises ethylene.

5. The method of claim 2 wherein the first component is ethylene, the component boiling below said first component is methane and the component boiling above said first component is ethane, and said sidestream comprises ethylene.

References Cited in the file of this patent

UNITED STATES PATENTS

| | | |
|---|---|---|
| 1,771,705 | Black | July 29, 1930 |
| 2,016,651 | Pennrich | Oct. 8, 1935 |
| 2,469,724 | Gross | May 10, 1949 |
| 2,534,274 | Kniel | Dec. 19, 1950 |
| 2,557,171 | Bodle | June 19, 1951 |
| 2,596,785 | Nelly | May 13, 1952 |
| 2,619,814 | Kniel | Dec. 2, 1952 |
| 2,629,239 | Gantt | Feb. 24, 1953 |
| 2,722,113 | Deming | Nov. 1, 1955 |